United States Patent
Ko et al.

(10) Patent No.: US 11,441,622 B1
(45) Date of Patent: Sep. 13, 2022

(54) CLUTCH CONTROL REFERENCE VALUE SETTING METHOD

(71) Applicants: Hyundai Motor Company, Seoul (KR); Kia Corporation, Seoul (KR)

(72) Inventors: Young Ho Ko, Yongin-si (KR); Woo Jung Kim, Suwon-si (KR); Young Min Yoon, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/461,538

(22) Filed: Aug. 30, 2021

(30) Foreign Application Priority Data

Mar. 9, 2021 (KR) .................. 10-2021-0030996

(51) Int. Cl.
| | |
|---|---|
| *F16D 48/06* | (2006.01) |
| *F16D 25/0638* | (2006.01) |
| *F16D 13/52* | (2006.01) |
| *F16D 21/00* | (2006.01) |
| *F16D 48/08* | (2006.01) |

(52) U.S. Cl.
CPC .......... *F16D 48/066* (2013.01); *F16D 13/52* (2013.01); *F16D 21/00* (2013.01); *F16D 25/0638* (2013.01); *F16D 48/08* (2013.01); *F16D 2500/1026* (2013.01); *F16D 2500/3022* (2013.01); *F16D 2500/3024* (2013.01); *F16D 2500/5018* (2013.01); *F16D 2500/50251* (2013.01); *F16D 2500/708* (2013.01); *F16D 2500/7082* (2013.01); *F16D 2500/70605* (2013.01)

(58) Field of Classification Search
None
See application file for complete search history.

(56) References Cited

U.S. PATENT DOCUMENTS

| | | | | |
|---|---|---|---|---|
| 8,577,571 | B2 * | 11/2013 | Einfinger | ............... F16D 48/066 |
| | | | | 701/67 |
| 9,279,464 | B2 * | 3/2016 | Trutschel | ................ F16D 48/02 |
| 9,587,685 | B2 * | 3/2017 | Bader | ...................... F16D 48/06 |
| 10,801,562 | B2 * | 10/2020 | Ko | ......... F16D 29/005 |
| 11,078,971 | B2 * | 8/2021 | Ko | ........................ F16D 25/082 |
| 2010/0114443 | A1 * | 5/2010 | Terwart | ................. F16H 61/688 |
| | | | | 701/68 |

FOREIGN PATENT DOCUMENTS

KR 10-2018-0069946 A 6/2018

* cited by examiner

*Primary Examiner* — Timothy Hannon
(74) *Attorney, Agent, or Firm* — Morgan, Lewis & Bockius LLP

(57) ABSTRACT

A method of setting a clutch control reference value may make it possible to more accurately learn the VKP of a hydraulic multi-plate clutch controlled by a solenoid valve, improving the accuracy of clutch control, and furthermore, to improve the quality of shifting a vehicle by the precise control of a transmission provided with such a clutch.

19 Claims, 7 Drawing Sheets

FIG. 7

CLUTCH CONTROL REFERENCE VALUE SETTING METHOD

CROSS-REFERENCE TO RELATED APPLICATION

The present application claims priority to Korean Patent Application No. 10-2021-0030996, filed Mar. 9, 2021, the entire contents of which is incorporated herein for all purposes by this reference.

BACKGROUND OF THE INVENTION

Field of the Invention

The present invention relates to a technology for setting a control reference value for controlling a hydraulic multi-plate clutch used in a transmission or the like of a vehicle.

Description of Related Art

Figure 1:
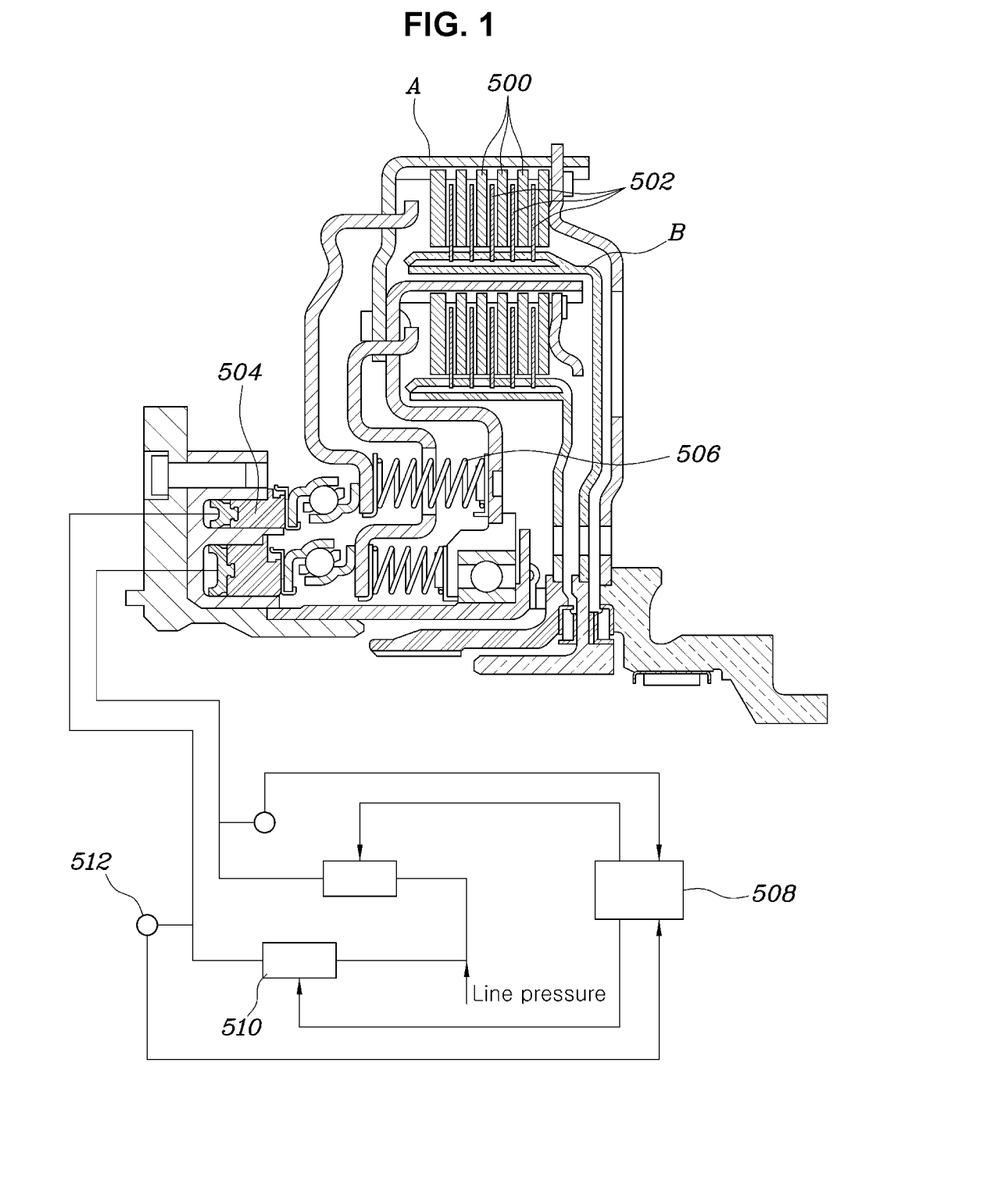
FIG. 1 is a diagram illustrating a control circuit of a hydraulic multi-plate clutch to which various exemplary embodiments of the present invention is applicable.

As illustrated in FIG. 1, a hydraulic multi-plate clutch, a plurality of clutch plates 500, and a plurality of clutch disks 502 alternately overlap each other between two rotation bodies A and B, and a piston 504 which is moved by hydraulic pressure pressurizes the overlapped clutch plates 500 and clutch disks 502 to be in close contact with each other, forming an engagement state in which power is transmitted. When the hydraulic pressure acting on the piston 504 is released, the elastic force of a spring 506 causes the piston 504 to return to the original position thereof, forming a released state in which the clutch plates 500 and the clutch disks 502 are capable of rotating relative to each other.

For reference, hereinafter, the hydraulic multi-plate clutch will be simply referred to as a "clutch".

In FIG. 1, two clutches are configured, and each clutch is configured to be supplied with a hydraulic pressure in a controlled manner. A solenoid valve 510 controlled by a controller 508 adjusts a supplied line pressure such that a desired hydraulic pressure may be supplied to the piston 504 of the clutch. The hydraulic pressure supplied to the piston 504 may be measured by each hydraulic sensor 512.

The hydraulic pressure supplied to the clutch through the control of the solenoid valve 510 tends to be linearly proportional to the control current applied to the solenoid valve 510 by the controller 508, except for some sections.

The reason why the control current and hydraulic pressure are not linear in some sections is mainly due to the structure of the clutch and the operation process obtained therefrom.

First, referring to the operation process of the clutch, when the control current of the solenoid valve 510 is gradually increased, the spring 506 of the clutch is initially maintained without being compressed. Accordingly, as the spring 506 is compressed due to the increase of the control current, the piston 504 starts to move.

The movement of the piston 504 is performed to a point where the clutch plate 500 and the clutch disk 502 are pressed and a substantial frictional force starts to be generated between the clutch plate 500 and the clutch disk 502. Thereafter, the pressure between the clutch plate 500 and the clutch disk 502 is increased with the hydraulic pressure increased due to the increase of the control current. However, it may be seen that the amount of movement of the piston 504 is insignificant and the piston 504 hardly moves.

As described above, in the operation process of the clutch according to the increase of the control current, in the initial stage in which the spring 506 of the clutch is not compressed, the hydraulic pressure acting on the piston 504 of the clutch starts to increase linearly with the increase of the control current. However, as the piston 504 moves due to the increase of the hydraulic pressure, the spring 506 starts to be compressed. Accordingly, until the piston 504 is in the state of being substantially unable to move due to close contact between the clutch plates 500 and the clutch disks 502, the volume of the space in which the hydraulic pressure of the clutch acts is changed, which results in a section in which the hydraulic pressure is nonlinear.

That is, some sections in which the control current and hydraulic pressure are not linear occur in the present way.

Thereafter, the piston 504 increases the pressure applied to the clutch plate 500 and the clutch disk 502, but when the amount of movement becomes insignificant, the hydraulic pressure of the clutch due to the increase of the control current increases linearly again.

The transmission of power between the two rotation bodies connected by the clutch is substantially performed from a position at which the hydraulic pressure recovers linearity again since the movement of the piston 504 is substantially stopped due to close contact between the clutch plates 500 and the clutch disks 502, and thus the change in the volume of the space in which the hydraulic pressure of the clutch acts is terminated. Thus, the present position is defined as a "volumetric kiss point (VKP)" or a "volumetric touch point (VTP)", and when controlling the clutch, the solenoid valve 510 is controlled by basically considering the VKP as a control reference value.

Therefore, it is desirable to enable the controller 508 to learn and set the VKP as rapidly and accurately as possible during the manufacture of a transmission, and to enable the controller to control the clutch based on the correct VKP set as described above in the state in which the transmission is mounted on a vehicle thereafter.

The information included in Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a method of setting a clutch control reference value that makes it possible to more accurately learn the VKP of a hydraulic multi-plate clutch controlled by a solenoid valve, improving the accuracy of clutch control, and furthermore, to improve the quality of shifting a vehicle by the precise control of a transmission provided with such a clutch.

In view of the foregoing, a method of setting a clutch control reference value according to various exemplary embodiments of the present invention includes: generating, by a controller, a current-hydraulic model using a slope of a measured hydraulic pressure obtained by measuring a hydraulic pressure acting on a clutch while changing a current applied by the controller to a solenoid valve electrically connected to the controller and fluidically connected to the clutch; setting, by the controller, a current at which a difference between a model hydraulic pressure determined according to the current-hydraulic pressure model and the measured hydraulic pressure is maximum as a temporary VKP while changing the current applied to the solenoid valve, and accumulating, by the controller, a number of times of setting the temporary VKP; determining, by the controller, whether a predetermined pressure drop occurs in a state in which the solenoid valve is made to form a pressure obtained by adding a predetermined first reference pressure to the temporary VKP; determining, by the controller, whether the predetermined pressure drop occurs in a state in which the solenoid valve is made to form a pressure obtained by subtracting a predetermined second reference pressure from the temporary VKP; making, by the controller, the solenoid valve form a fourth reference pressure obtained by subtracting a predetermined third reference pressure from the temporary VKP when the pressure drop does not occur in the state in which the solenoid valve is made to form the pressure obtained by adding the predetermined first reference pressure to the temporary VKP and when the pressure drop occurs in the state in which the solenoid valve is made to form the pressure obtained by subtracting the predetermined second reference pressure from the temporary VKP; determining, by the controller, the pressure drop in a state in which the solenoid valve forms the fourth reference pressure and determining, by the controller, whether the pressure drop is within a predetermined reference range; storing, by the controller, the fourth reference pressure as a candidate VKP upon determining that the pressure drop is within the predetermined reference range, and accumulating, by the controller, a number of times of storing the same fourth reference pressure as the candidate VKP; and determining, by the controller, whether the pressure drop is within the predetermined reference range and repeating, by the controller, the storing of the fourth reference pressure as the candidate VKP and the setting of the candidate VKP as a final VKP upon determining that the number of times of storing the same fourth reference pressure as the candidate VKP becomes a predetermined first reference number of times.

When the pressure drop occurs in the state in which the solenoid valve is made to form the pressure obtained by adding the predetermined first reference pressure to the temporary VKP or upon determining that the pressure drop does not occur in the state in which the solenoid valve is made to form the pressure obtained by subtracting the predetermined second reference pressure from the temporary VKP, the setting of the temporary VKP and the accumulating of the number of times of setting the temporary VKP may be repeated.

The setting of the temporary VKP and the accumulating of the number of times of setting the temporary VKP may be repeated together with the generating of the current-hydraulic pressure model.

When the number of times of setting the temporary VKP is a predetermined first reference number, among temporary VKPs that have been set until the first reference number is reached, an average value of remaining temporary VKPs excluding the maximum value and the minimum value may be set as the final VKP.

The method may further include updating the fourth reference pressure as a pressure obtained by subtracting a predetermined fifth reference pressure from the fourth reference pressure upon determining that the pressure drop is smaller than the reference range as a result of determining the pressure drop in the state in which the solenoid valve is set the fourth reference pressure, wherein the determining of the pressure drop may be repeated in a state in which the solenoid valve is made to form the updated fourth reference pressure.

The method may further include updating the fourth reference pressure as a pressure obtained by adding a predetermined sixth reference pressure to the fourth reference pressure upon determining that the pressure drop is greater than the reference range as a result of determining the pressure drop in the state in which the solenoid valve is set the fourth reference pressure, wherein the determining of the pressure drop may be repeated in a state in which the solenoid valve is made to form the updated fourth reference pressure.

The present invention makes it possible to more accurately learn the VKP of a hydraulic multi-plate clutch controlled by a solenoid valve, improving the accuracy of clutch control, and furthermore, to improve the quality of shifting a vehicle by the precise control of a transmission provided with such a clutch.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Referring to FIG. 2, FIG. 3, FIG. 4, FIG. 5, FIG. 6, and FIG. 7, an exemplary embodiment of a method of setting a clutch control reference value includes: generating, by a controller, a current-hydraulic model using a slope of a measured hydraulic pressure obtained by measuring a hydraulic pressure acting on a clutch while changing a current applied by the controller to a solenoid valve (S10); setting, by the controller, a current at which a difference between a model hydraulic pressure determined according to the current-hydraulic pressure model and the measured hydraulic pressure is maximum as a temporary VKP while changing the current applied to the solenoid valve, and accumulating a number of times of setting the temporary VKP (S20); determining, by the controller, whether a predetermined pressure drop occurs in a state in which the solenoid valve is made to form a pressure obtained by adding a predetermined first reference pressure to the temporary VKP (S30); determining, by the controller, whether the predetermined pressure drop occurs in a state in which the solenoid valve is made to form a pressure obtained by subtracting a predetermined second reference pressure from the temporary VKP (S40); making, by the controller, the solenoid valve form a fourth reference pressure obtained by subtracting a predetermined third reference pressure from the temporary VKP when the pressure drop does not occur in the state in which the solenoid valve is made to form the pressure obtained by adding the predetermined first reference pressure to the temporary VKP and when the pressure drop occurs in the state in which the solenoid valve is made to form the pressure obtained by subtracting the predetermined second reference pressure from the temporary VKP (S50); determining, by the controller, the pressure drop in a state in which the solenoid valve forms the fourth reference pressure and determining, by the controller, whether the pressure drop is within a predetermined reference range (S60); storing, by the controller, the fourth reference pressure as a candidate VKP upon determining that the pressure drop is within the predetermined reference range, and accumulating, by the controller, the number of times of storing the same fourth reference pressure as the candidate VKP (S70); and determining, by the controller, whether the pressure drop is within the predetermined reference range and repeating, by the controller, the storing of the fourth reference pressure as the candidate VKP and the setting of the candidate VKP as a final VKP upon determining that the number of times of storing the same fourth reference pressure as the candidate VKP becomes a predetermined second reference number of times (S80).

Of course, when the final VKP is set as described above, the controller is configured for controlling the solenoid valve using the final VKP thereafter, accurately controlling the clutch provided to receive the hydraulic pressure controlled by the solenoid valve. When the clutch is in a transmission mounted on a vehicle, it is possible to ensure excellent transmission quality of the vehicle through precise control of the transmission.

In the operation in which the controller generates a current-hydraulic model using the slope of a measured hydraulic pressure obtained by measuring the hydraulic pressure acting on the clutch while changing the current applied to the solenoid valve, it is possible to measure the hydraulic pressure acting on the clutch while gradually increasing the current applied to the solenoid valve.

Figure 4:
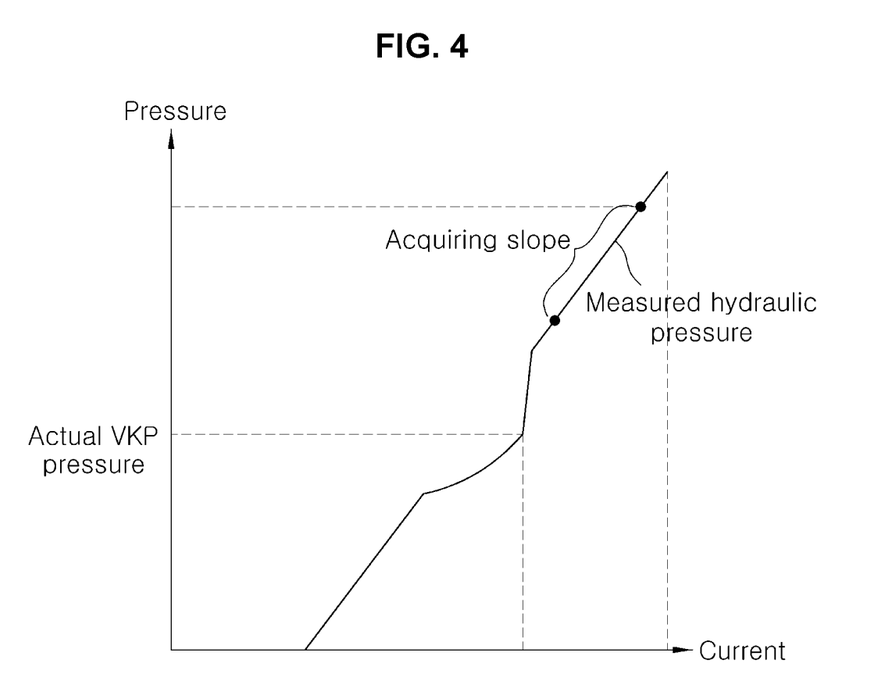
FIG. 4 is a graph illustrating how a controller acquires a slope of a measured hydraulic pressure while increasing current applied to a solenoid valve.

In the instant case, as illustrated in FIG. 4, the slope of the measured hydraulic pressure is obtained in a section in which the hydraulic pressure increases linearly following a section in which the hydraulic pressure increases nonlinearly and then increases linearly with the increase in current.

Figure 5:
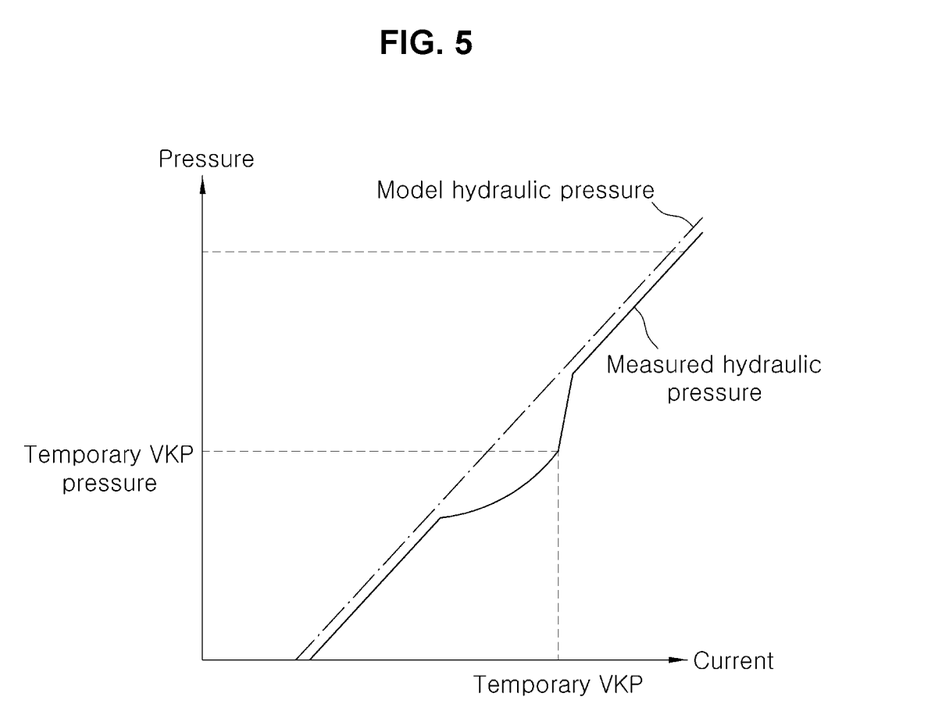
FIG. 5 is a graph illustrating how a controller sets a temporary VKP while increasing current applied to a solenoid valve.

In the setting, as a temporary VKP, the current at which the difference between the model hydraulic pressure determined based on the current-hydraulic model and the measured hydraulic pressure is maximum while changing the current applied to the solenoid valve the hydraulic pressure acting on the clutch is measured while gradually increasing the current applied to the solenoid valve, and as illustrated in FIG. 5, a point where the difference between the model hydraulic pressure and the measured hydraulic pressure is maximized is found, and the current at that time is set as the temporary VKP.

Furthermore, the temporary VKP, which is set as described above, is continuously stored until the number of times of setting the temporary VKP reaches a first reference number of times to be described later.

The state in which the solenoid valve is made to form a pressure obtained by adding a predetermined first reference pressure to a temporary VKP means the state in which a current obtained by adding a current substantially configured for forming the first reference pressure to the current of the temporary VKP is applied to the solenoid valve.

That is, here, pressures and currents are treated as physical quantities which may be replaced with each other by the current-hydraulic model.

Figure 6:
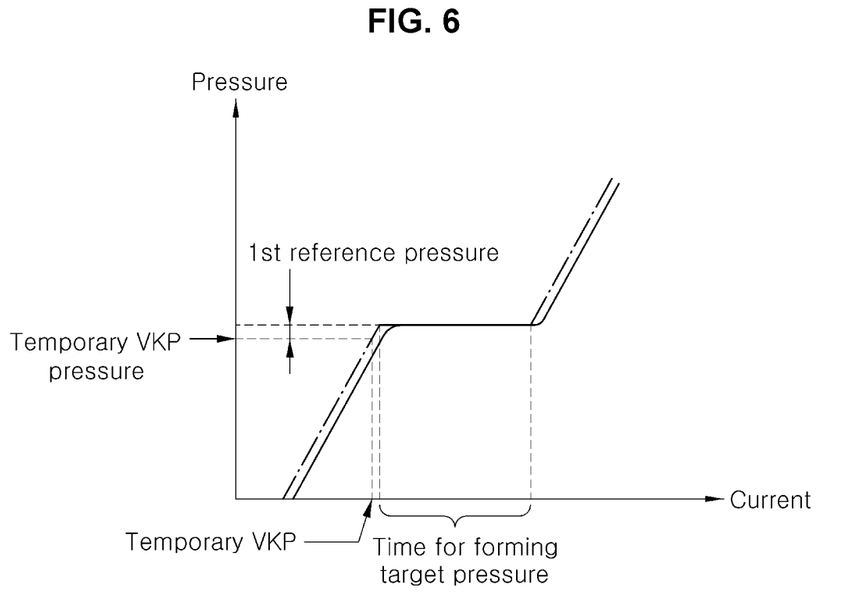
FIG. 6 is a graph illustrating a situation in which a pressure drop does not occur since no sticking occurs in the solenoid valve.

Determining whether a predetermined pressure drop occurs in the state in which the solenoid valve is made to form a pressure obtained by adding a predetermined first reference pressure to the temporary VKP means determining the degree to which the measured hydraulic pressure follows the model hydraulic pressure while additionally increasing the current after a time for forming a target pressure has elapsed in the state in which the current configured for forming the pressure obtained by adding the predetermined first reference pressure to the temporary VKP, as illustrated in FIG. 6.

That is, when the current applied to the solenoid valve is additionally increased in the state in which the target pressure (the temporary VKP+the first reference pressure) is formed, if the temporary VKP is substantially the same as the actual VKP and no sticking occurs in the solenoid valve, it is necessary for the measured hydraulic pressure to immediately follow the model hydraulic pressure such that no pressure drop is caused, as illustrated in FIG. 6. Thus, it is determined whether such a behavior occurs.

Figure 7:
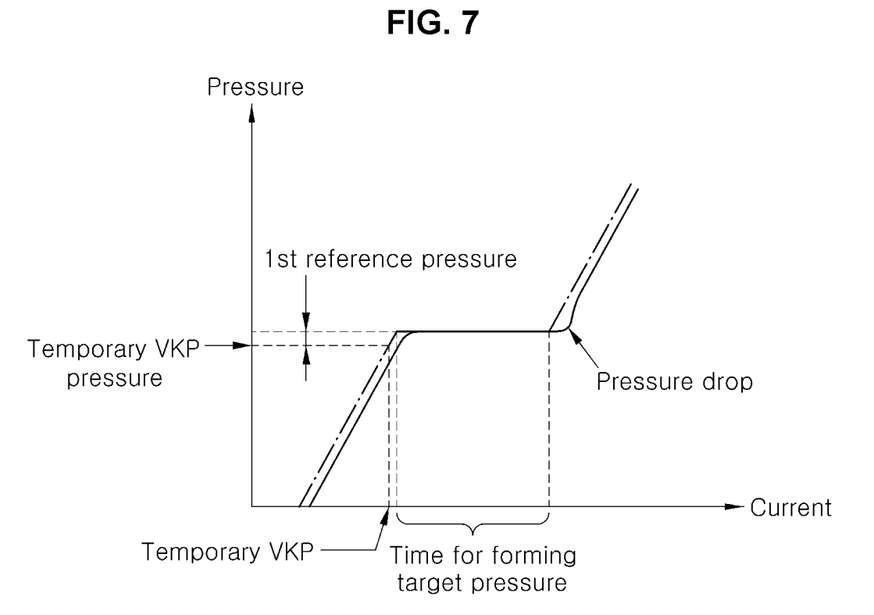
FIG. 7 is a graph illustrating a situation in which a pressure drop occurs due to sticking occurring in a solenoid valve.

When sticking occurs in the solenoid valve even if the temporary VKP is substantially the same as the actual VKP, the model hydraulic pressure immediately increases as the current increases, but the measured hydraulic pressure increases after a delay when the stuck state is resolved rather than immediately increasing, as illustrated in FIG. 7. In the instant case, it is possible to determine the pressure drop by integrating the difference between the model hydraulic pressure and the measured hydraulic pressure.

That is, it is possible to determine the pressure drop by integrating the difference between the model hydraulic pressure and the measured hydraulic pressure when the current is additionally increased from the state in which the solenoid valve is made to form an arbitrary target pressure near the actual VKP as described above.

Of course, as can also be seen from FIG. 6 and FIG. 7, a slight difference is always caused between the model hydraulic pressure and the measured hydraulic pressure due to a basic response delay even when the solenoid valve is normal. Thus, the pressure drop obtained by integrating the difference between the model hydraulic pressure and the measured hydraulic pressure as described above will always be positive.

Accordingly, when there is a value substantially remaining after subtracting the pressure drop according to the basic response delay from the pressure drop determined as described above, it is determined that the pressure drop occurs.

The first reference pressure is set to a level that makes it possible to determine whether or not sticking occurs in the solenoid valve as described above, and to determine whether the temporary VKP is located close to the actual VKP. For example, the first reference pressure may be set to 0.5 bar.

The time for forming the target pressure is set in consideration of a sufficient time for the hydraulic pressure to substantially and stably reach the target pressure after a current to form the target pressure is applied to the solenoid valve. For example, the time for forming the target pressure may be set to 1.3 seconds or the like.

Even in the determining whether the pressure drop occurs in the state in which the solenoid valve forms a pressure obtained by subtracting a predetermined second reference pressure from the temporary VKP, it is determined whether the pressure drop occurs by observing the following state of the measured hydraulic pressure according to the increase of the model hydraulic pressure while applying a current such that the solenoid valve forms a target pressure (a temporary VKP: a second reference pressure), then maintaining the current for the time for forming the target pressure, and then increasing the current again, as described above.

When the temporary VKP is similar to the actual VKP, the measured hydraulic pressure passes through the nonlinear section as the current increases, so that the pressure drop may occur.

However, when the pressure drop does not occur, it may be interpreted as meaning that the temporary VKP is inappropriate.

According to the above-described purpose, the second reference pressure may also be set to a level that makes it possible to determine whether the current temporary VKP is similar to the actual VKP, and may be set to, for example, 0.5 bar or the like.

Accordingly, when the pressure drop occurs in the state in which the solenoid valve is made to form the pressure obtained by adding the predetermined first reference pressure to the temporary VKP or when the pressure drop does not occur in the state in which the solenoid valve is made to form the pressure obtained by subtracting the predetermined second reference pressure from the temporary VKP, it is possible to more correctly set the temporary VKP by repeating the setting of the temporary VKP and the accumulating of the number of times of setting the temporary VKP.

The setting of the temporary VKP and the accumulating of the number of times of setting the temporary VKP may be repeated together with the generating of the current-hydraulic pressure model.

Figure 2:
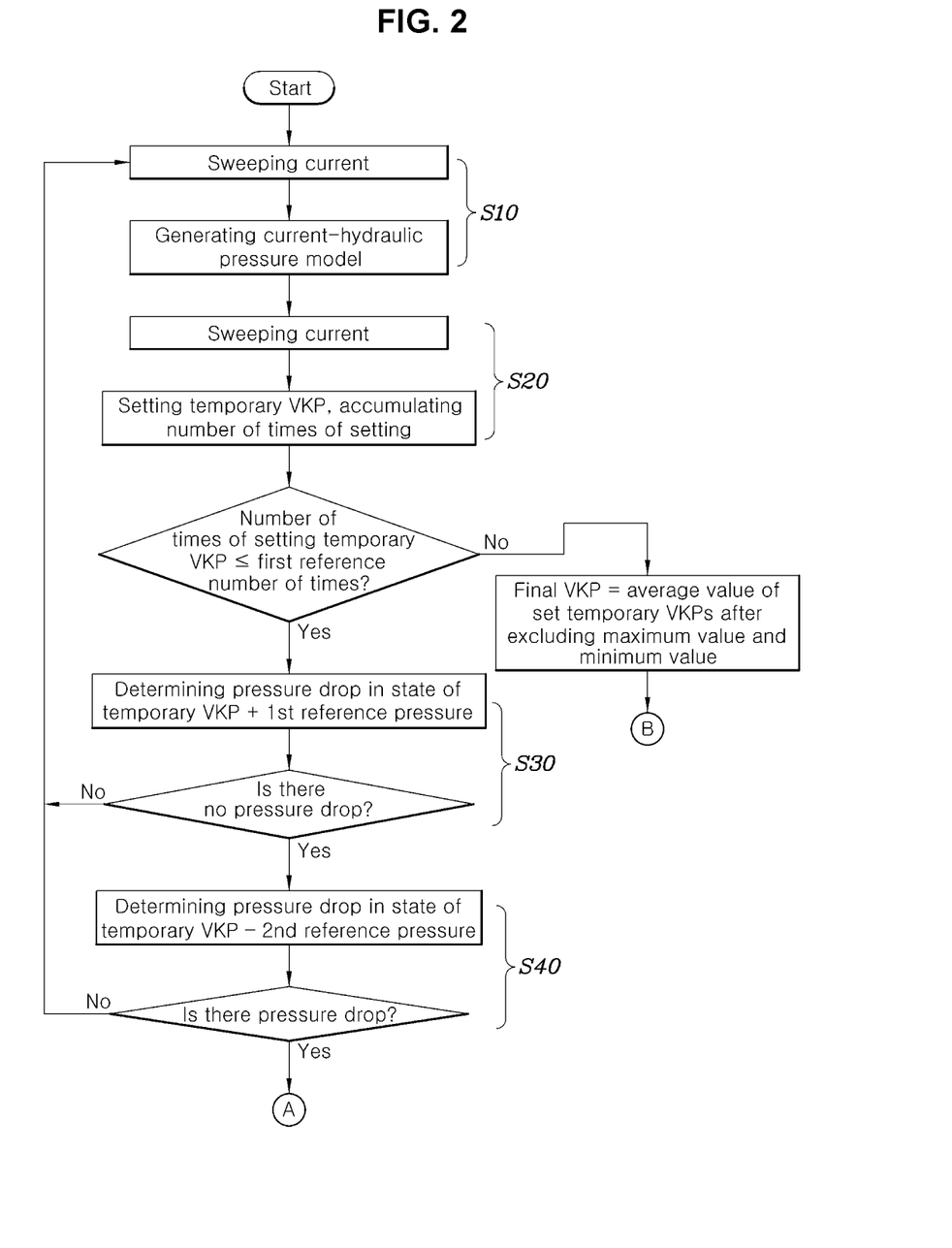
FIG. 2 and FIG. 3 are flowcharts each illustrating an exemplary embodiment of a method of setting a clutch control reference value according to various exemplary embodiments of the present invention.
Figure 3:
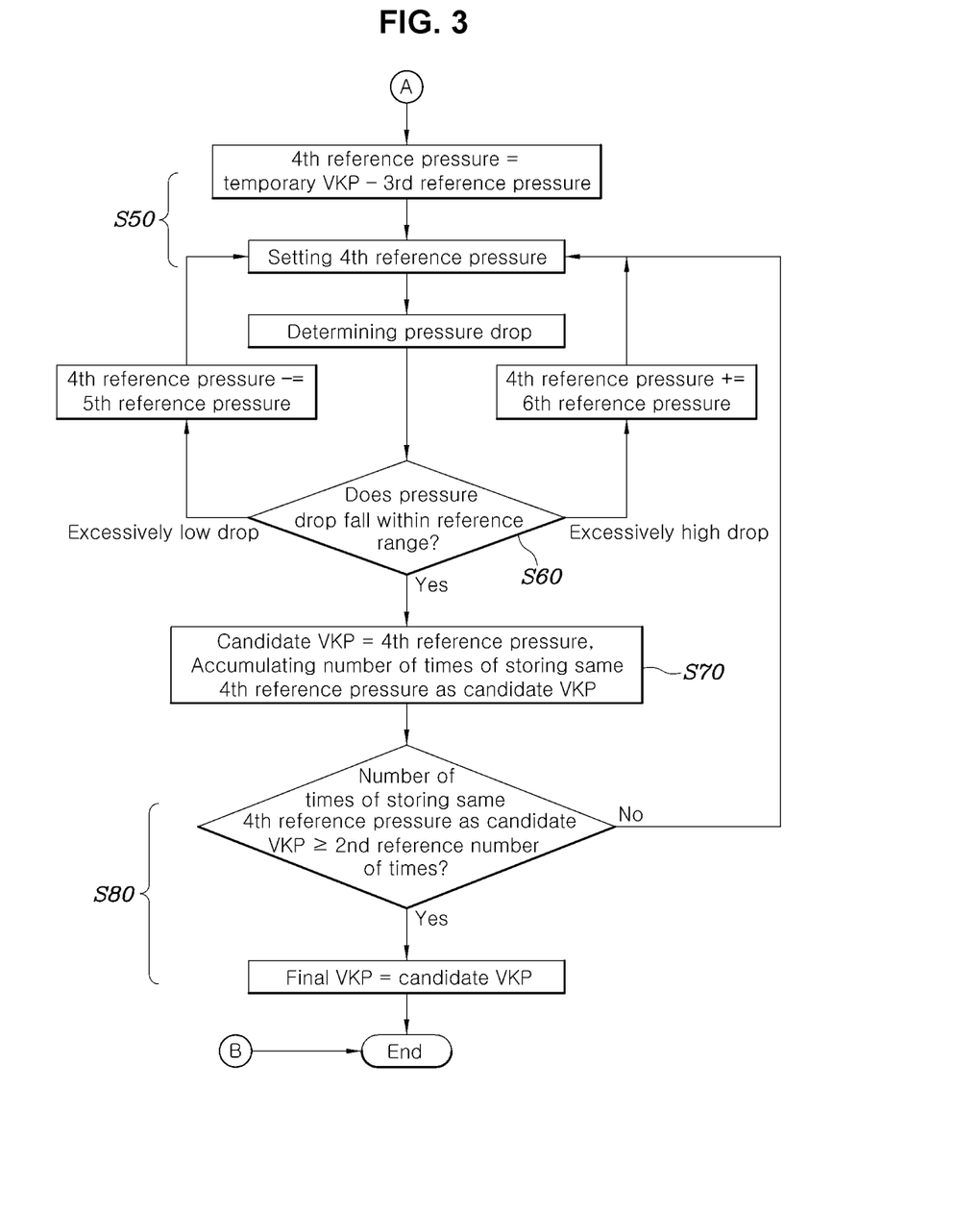

That is, as illustrated in FIG. 2 and FIG. 3, a current sweep is performed to gradually increase the current applied to the solenoid valve to obtain the slope of the measured hydraulic pressure to generate a current-hydraulic model, then a current sweep is performed again, and the entire process of setting the temporary VKP using the difference between the model hydraulic pressure based on a model-hydraulic pressure model and the measured hydraulic pressure is repeated.

Of course, it may also be possible to set the temporary VKP by obtaining again the measured hydraulic pressure by sweeping the current and using the current-hydraulic model generated in the previous process while omitting the generating of the current-hydraulic model.

When the number of times of setting the temporary VKP is a predetermined first reference number, among temporary VKPs that have been set until the first reference number is reached, an average value of remaining temporary VKPs excluding a maximum value and a minimum value is set as the final VKP.

When the number of times of setting the temporary VKP has reached to the first number of times, it means that an appropriate pressure drop operation has not been determined although the processes of setting the temporary VKP, determining the pressure drop in the state of the target pressure according to the first reference pressure, and determining the pressure drop in the state of the target pressure according to the second reference pressure were repeated multiple times. Thus, it is determined that it is a situation in which the setting of an appropriate VKP is difficult under the determination using the pressure drop due to the influence of the sticking phenomenon of the solenoid valve or the like, and the average value of the temporary VKPs, which have been set so far, is set as the final VKP.

In the instant case, the maximum and minimum values are excluded from the temporary VKPs, which have been set so far to avoid the influence of noise as much as possible.

Therefore, the first reference number of times is set to a degree that makes it possible to determine whether it is difficult to set an appropriate VKP based on the determination made using the pressure drop anymore according to the above-described purpose. The first reference number of times may be determined by design through a number of tests and analysis, and may be set to, for example, five times or the like.

Meanwhile, in the determining of the pressure drop in the state in which the solenoid valve forms a fourth reference pressure obtained by subtracting a predetermined third reference pressure from the temporary VKP, and determining whether the pressure drop is within a predetermined reference range, the controller is configured to apply a current to form a target pressure (the fourth reference pressure) to the solenoid valve, as described above, and after the time for forming the target pressure time elapses, the controller is configured to determine whether the pressure drop appropriately occurs by observing the state in which the measured hydraulic pressure follows the increase of the model hydraulic pressure while increasing the current again.

Here, the reference range of the pressure drop may be set by adding a little margin up and down with reference to the pressure drop obtained by integrating the difference between the model hydraulic pressure and the measured hydraulic pressure while increasing the current again after the time for forming the target pressure in the state in which a current corresponding to the actual VKP is applied to the solenoid, and may be determined by design by performing the tests described above multiple times in advance.

That is, the reference range of the pressure drop is set such that it is possible to determine whether the currently set temporary VKP is sufficiently close to the actual VKP, and to determine whether the candidate VKP may be set as the final VKP.

For reference, when the pressure drop is obtained in the state in which a current corresponding to an actual VKP is applied to the solenoid valve, the measured hydraulic pressure forms a slightly nonlinear section and then a linear section, and thus it is normal that a slight pressure drop occurs accordingly. When the pressure drop is within the predetermined reference range, it means that the pressure drop occurs at the level described above.

Here, the third reference pressure is set such that, even if the current temporary VKP is the same as the actual VKP, the pressure drop which is substantially generated in a process of determining whether a pressure drop occurs as described above can exceed the reference range.

This is due to the following reason: when it is determined that the pressure drop obtained using the fourth reference pressure obtained by subtracting the third reference pressure from the temporary VKP as a target pressure exceeds the reference range and then the pressure drop obtained while updating the fourth reference pressure (a target pressure) to be described later gradually converges to a value within the above reference range, it is possible to consider that the fourth reference pressure gradually approaches the actual VKP while being updated, and ultimately, it is possible to set a more accurate VKP.

Accordingly, according to the above-described purpose, even if the temporary VKP is the same as the actual VKP, it is desirable to set the third reference pressure to a level at which the pressure drop obtained using, as a target pressure, a fourth reference pressure obtained by subtracting the third reference pressure from the temporary VKP exceeds the reference range. The third reference pressure may be determined by design through a number of tests and analysis, and may be set to, for example, 0.5 bar.

The method may further include updating the fourth reference pressure as a pressure obtained by subtracting a predetermined fifth reference pressure from the fourth reference pressure when the pressure drop is smaller than the reference range as a result of determining the pressure drop in the state in which the solenoid valve is set the fourth reference pressure, wherein the determining of the pressure drop is repeated in a state in which the solenoid valve is made to form the updated fourth reference pressure.

Furthermore, the method may further include updating the fourth reference pressure as a pressure obtained by adding a predetermined sixth reference pressure to the fourth reference pressure when the pressure drop is greater than the reference range as a result of determining the pressure drop in the state in which the solenoid valve is set the fourth reference pressure, wherein the determining of the pressure drop is repeated in a state in which the solenoid valve is made to form the updated fourth reference pressure.

That is, from the state in which the pressure drop obtained using, as a target pressure, the fourth reference pressure obtained by subtracting the third reference pressure from the temporary VKP is made to exceed the reference range, the fourth reference pressure close to the actual VKP is found by increasing the fourth reference pressure (target pressure) by the sixth reference pressure such that the pressure drop converges to a value within the reference range, as described above.

However, when the pressure drop obtained using, as a target pressure, the fourth reference pressure obtained by subtracting the third reference pressure from the temporary VKP does not reach the reference range, the fourth reference pressure close to the actual VKP is found by decreasing the fourth reference pressure (target pressure) by the fifth reference pressure such that the pressure drop converges to a value within the reference range.

Therefore, according to the above-described purpose, to make the fourth reference pressure converge to the actual VKP, it is desirable to appropriately set the fifth reference pressure and the sixth reference pressure through a plurality of tests and analysis such that the fifth reference pressure and the sixth pressure can relatively accurately converge to the actual VKP without repeating the above-described processes too long. For example, the fifth reference pressure and the sixth reference pressure may be set to 0.1 bar or the like.

Of course, the fifth reference pressure and the sixth reference pressure may be set equal to each other, but may be set to different values.

As the fourth reference pressure is gradually updated as described above, when it is determined that the pressure drop obtained using the fourth reference pressure as the target pressure falls within the reference range, the fourth reference pressure at that time is stored as a candidate VKP, the pressure drop is obtained again using the fourth reference pressure as a target pressure, it is determined whether the pressure drop falls within the reference range, and the process of storing the fourth reference pressure at that time as the candidate VKP is repeated.

When the number of times of storing the fourth reference pressure of the same value as the candidate VKP reaches the second reference number of times by repeating the above process, it may be assured that the candidate VKP at the instant time is substantially the same as the actual VKP. Thus, the candidate VKP is stored as the final VKP, and then the controller controls the clutch using the final VKP.

Accordingly, according to the above-described purpose, the second reference number of times is set to a level that makes it possible to determine that it is appropriate to set the candidate VKP as the final VKP, and may be set to, for example, five times or the like.

Furthermore, the term related to a control device such as "controller", "control unit", "control device" or "control module", etc. refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method disclosed in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc. and implementation as carrier waves (e.g., transmission over the Internet).

In various exemplary embodiments of the present invention, each operation described above may be performed by a control device, and the control device may be configured by a plurality of control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

Furthermore, the term of "fixedly connected" signifies that fixedly connected members always rotate at a same speed. Furthermore, the term of "selectively connectable" signifies "selectively connectable members rotate separately when the selectively connectable members are not engaged to each other, rotate at a same speed when the selectively connectable members are engaged to each other, and are stationary when at least one of the selectively connectable members is a stationary member and remaining selectively connectable members are engaged to the stationary member".

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method of setting a clutch control reference value, the method comprising:
generating, by a controller, a current-hydraulic model using a slope of a measured hydraulic pressure obtained by measuring a hydraulic pressure acting on a clutch while changing a current applied by the controller to a solenoid valve electrically connected to the controller and fluidically connected to the clutch;
setting, by the controller, a current at which a difference between a model hydraulic pressure determined according to the current-hydraulic pressure model and the measured hydraulic pressure is maximum, as a temporary volumetric kiss point (VKP) while changing the current applied to the solenoid valve, and accumulating, by the controller, a number of times of setting the temporary VKP;
determining, by the controller, whether a predetermined pressure drop occurs in a state in which the solenoid valve is made to form a pressure obtained by adding a predetermined first reference pressure to the temporary VKP;
determining, by the controller, whether the predetermined pressure drop occurs in a state in which the solenoid valve is made to form a pressure obtained by subtracting a predetermined second reference pressure from the temporary VKP;
making, by the controller, the solenoid valve form a fourth reference pressure obtained by subtracting a predetermined third reference pressure from the temporary VKP upon determining that the pressure drop does not occur in a state in which the solenoid valve is made to form the pressure obtained by adding the predetermined first reference pressure to the temporary VKP and upon determining that the pressure drop occurs in a state in which the solenoid valve is made to form the pressure obtained by subtracting the predetermined second reference pressure from the temporary VKP;
determining, by the controller, the pressure drop in a state in which the solenoid valve forms the fourth reference pressure and determining, by the controller, whether the pressure drop is within a predetermined reference range;
storing, by the controller, the fourth reference pressure as a candidate VKP upon determining that the pressure drop is within the predetermined reference range, and accumulating, by the controller, a number of times of storing the same fourth reference pressure as the candidate VKP;
determining, by the controller, whether the pressure drop is within the predetermined reference range and repeating, by the controller, the storing of the fourth reference pressure as the candidate VKP and the setting of the candidate VKP as a final VKP upon determining that the number of times of storing the same fourth reference pressure as the candidate VKP becomes a predetermined first reference number of times; and
controlling, by the controller, the solenoid valve using the final VKP.

2. The method of claim 1, further including:
repeating, by the controller, the setting of the temporary VKP and the accumulating of the number of times of setting the temporary VKP, upon determining that the pressure drop occurs in the state in which the solenoid valve is made to form the pressure obtained by adding the predetermined first reference pressure to the temporary VKP or upon determining that the pressure drop does not occur in the state in which the solenoid valve is made to form the pressure obtained by subtracting the predetermined second reference pressure from the temporary VKP.

3. The method of claim 2, wherein the setting of the temporary VKP and the accumulating of the number of times of setting the temporary VKP are repeated with the generating of the current-hydraulic pressure model.

4. The method of claim 1, further including:
setting, by the controller, an average value of temporary VKPs that have been set until a predetermined second reference number is reached, as the final VKP, upon determining that the number of times of setting the temporary VKP is the predetermined second reference number.

5. The method of claim 4, wherein in setting the average value, remaining temporary VKPs excluding a maximum value and a minimum value among the temporary VKPs is set as the final VKP.

6. The method of claim 1, further including:
updating, by the controller, the fourth reference pressure as a pressure obtained by subtracting a predetermined fifth reference pressure from the fourth reference pressure upon determining that the pressure drop is smaller than the reference range as a result of determining the pressure drop in the state in which the solenoid valve is set the fourth reference pressure.

7. The method of claim 6,
wherein the determining of the pressure drop is repeated in a state in which the solenoid valve is made to form the updated fourth reference pressure.

8. The method of claim 1, further including:
updating, by the controller, the fourth reference pressure as a pressure obtained by adding a predetermined sixth reference pressure to the fourth reference pressure upon determining that the pressure drop is greater than the reference range as a result of determining the pressure drop in the state in which the solenoid valve is set the fourth reference pressure.

9. The method of claim 8, wherein the determining of the pressure drop is repeated in a state in which the solenoid valve is made to form the updated fourth reference pressure.

10. A non-transitory computer readable storage medium on which a program for performing the method of claim 1 is recorded.

11. A clutch apparatus for setting a clutch control reference value, the clutch apparatus comprising:
a clutch;
a solenoid valve fluidically connected to the clutch; and
a controller electrically connected to the solenoid valve, wherein the controller is configured for:
generating a current-hydraulic model using a slope of a measured hydraulic pressure obtained by measuring a hydraulic pressure acting on the clutch while changing a current applied by the controller to the solenoid valve;
setting a current at which a difference between a model hydraulic pressure determined according to the current-hydraulic pressure model and the measured hydraulic pressure is maximum as a temporary volumetric kiss point (VKP) while changing the current applied to the solenoid valve, and accumulating a number of times of setting the temporary VKP;
determining whether a predetermined pressure drop occurs in a state in which the solenoid valve is made to form a pressure obtained by adding a predetermined first reference pressure to the temporary VKP;
determining whether the predetermined pressure drop occurs in a state in which the solenoid valve is made to form a pressure obtained by subtracting a predetermined second reference pressure from the temporary VKP;
making the solenoid valve form a fourth reference pressure obtained by subtracting a predetermined third reference pressure from the temporary VKP upon determining that the pressure drop does not occur in a state in which the solenoid valve is made to form the pressure obtained by adding the predetermined first reference pressure to the temporary VKP and upon determining that the pressure drop occurs in a state in which the solenoid valve is made to form the pressure obtained by subtracting the predetermined second reference pressure from the temporary VKP;
determining, the pressure drop in a state in which the solenoid valve forms the fourth reference pressure and determining, by the controller, whether the pressure drop is within a predetermined reference range;
storing the fourth reference pressure as a candidate VKP upon determining that the pressure drop is within the predetermined reference range, and accumulating, by the controller, a number of times of storing the same fourth reference pressure as the candidate VKP;
determining whether the pressure drop is within the predetermined reference range and repeating, by the controller, the storing of the fourth reference pressure as the candidate VKP and the setting of the candidate VKP as a final VKP upon determining that the number of times of storing the same fourth reference pressure as the candidate VKP becomes a predetermined first reference number of times; and
controlling the solenoid valve using the final VKP.

12. The clutch apparatus of claim 11, wherein the controller is further configured for:
repeating the setting of the temporary VKP and the accumulating of the number of times of setting the temporary VKP, upon determining that the pressure drop occurs in the state in which the solenoid valve is made to form the pressure obtained by adding the predetermined first reference pressure to the temporary VKP or upon determining that the pressure drop does not occur in the state in which the solenoid valve is made to form the pressure obtained by subtracting the predetermined second reference pressure from the temporary VKP.

13. The clutch apparatus of claim 12, wherein the setting of the temporary VKP and the accumulating of the number of times of setting the temporary VKP are repeated with the generating of the current-hydraulic pressure model.

14. The clutch apparatus of claim 11, wherein the controller is further configured for:
setting an average value of temporary VKPs that have been set until a predetermined second reference number is reached, as the final VKP, upon determining that the number of times of setting the temporary VKP is the predetermined second reference number.

15. The clutch apparatus of claim 14, wherein in setting the average value, remaining temporary VKPs excluding a maximum value and a minimum value among the temporary VKPs is set as the final VKP.

16. The clutch apparatus of claim 11, wherein the controller is further configured for:
updating the fourth reference pressure as a pressure obtained by subtracting a predetermined fifth reference pressure from the fourth reference pressure upon determining that the pressure drop is smaller than the reference range as a result of determining the pressure drop in the state in which the solenoid valve is set the fourth reference pressure.

17. The clutch apparatus of claim 16,
wherein the determining of the pressure drop is repeated in a state in which the solenoid valve is made to form the updated fourth reference pressure.

18. The clutch apparatus of claim 11, wherein the controller is further configured for:
updating the fourth reference pressure as a pressure obtained by adding a predetermined sixth reference pressure to the fourth reference pressure upon determining that the pressure drop is greater than the reference range as a result of determining the pressure drop in the state in which the solenoid valve is set the fourth reference pressure.

19. The clutch apparatus of claim 18, wherein the determining of the pressure drop is repeated in a state in which the solenoid valve is made to form the updated fourth reference pressure.

* * * * *